United States Patent [19]
Merrett

[11] Patent Number: 5,588,779
[45] Date of Patent: Dec. 31, 1996

[54] SIGHT, VENT, AND DRAIN ASSEMBLY FOR AN UNDERGROUND TANK

[75] Inventor: Stanley L. Merrett, Dadeville, Ala.

[73] Assignee: Schlumberger Industries, Inc., Norcross, Ga.

[21] Appl. No.: 483,408

[22] Filed: Jun. 7, 1995

[51] Int. Cl.[6] .................................................. G01F 23/56
[52] U.S. Cl. .................................................. 405/54; 73/322
[58] Field of Search ............................ 405/52, 53, 54; 239/74, 71; 169/26, 66, DIG. 1, 29, 13, 5; 73/309, 323, 322

[56] References Cited

U.S. PATENT DOCUMENTS

| | | | |
|---|---|---|---|
| 4,147,893 | 4/1979 | Matson | 73/301 X |
| 4,280,126 | 7/1981 | White | 340/621 |
| 4,593,855 | 6/1986 | Forsyth | 239/74 |
| 5,085,077 | 2/1992 | Stapleton et al. | 73/290 V |

Primary Examiner—Stephen J. Novosad
Attorney, Agent, or Firm—Leonard W. Pojunas

[57] ABSTRACT

An improved method and apparatus for use with an underground tank of fire suppression fluid in which the fluid level within the tank can be visually determined quickly during pumping operations. Also, the fluid in the underground tank is protected from freezing by draining the fluid standing above the top of the tank. Protection against collapse or rapture of the underground tank is provided by a method of ventilating air into and out of the tank.

12 Claims, 3 Drawing Sheets

SIGHT, VENT, AND DRAIN ASSEMBLY FOR AN UNDERGROUND TANK

BACKGROUND OF THE INVENTION

1. Field of the Invention

This invention relates to a water reservoir and, more particularly, to an underground water tank used for fire suppression.

2. Background Art

In fire fighting, the location and quantity of water needed to combat the flames is a paramount consideration. This factor is particularly acute in rural settings where there is no centralized water service. In rural communities where no lakes, ponds, or the like are nearby, the ability to fight fires is limited to the amount of water that can be carded on a truck and pumped from local residential wells. The combination of these two sources can be insufficient for large fires—the tank capacity on the trucks being limited and the residential wells having too meager a discharge rate and pressure. An additional source of water is thus needed in these areas.

One alternative that exists in the prior art is an underground tank which is filled with water. Use of these tanks in fire fighting, however, has been limited because the level of fluid could not be easily determined. This is a severe limitation during fire suppression because the operators could not accurately gauge the time or water remaining before the tank was pumped dry.

In addition to these tanks having a significant weakness for use in fire fighting, they likewise fell short of satisfying insurance regulations to be a viable suction source. The Insurance Services Office ("ISO") is the regulatory agency which evaluates fire departments in establishing their ability to extinguish a fire. The ISO specifically addresses suction supplies in its June 1980 edition of the Fire Suppression Rating Schedule. Section 611.E of this edition states: "Where bays, rivers, canals, streams, ponds, wells, cisterns, or other similar sources are available as suction supply for fire department pumpers, the suction supply shall be considered with respect to its ability, including accessibility, availability during freezing weather, floods, droughts, or other adverse conditions to satisfy the Need Fire Flow (NFF) at test locations." Thus, with a tank or cistern buried beneath the ground to be a viable source of water, there must be an apparatus to verify the amount of water. Without such a means to determine the level of water, the source is considered an adverse condition in an insurance evaluation.

Another part of the ISO requirement for a suction source is accessibility during freezing weather. Underground tanks are subject to becoming inapplicable, especially when filled to a point of overflowing so that water remains above the frost line in the ground. Underground tanks thus could be nonfunctional during the winter months.

ISO evaluations consider these limitations of underground tanks that exist in the prior art. Since forty percent (40%) of an evaluation is based on water supply, homes in rural settings are thus frequently penalized for lack of water suction sources. Underground tanks, because of their limitations, do not reduce or alleviate this negative evaluation.

Accordingly, there is a need in the art for a convenient and reliable method of indicating the level of water in an underground tank or cistern. Likewise, a need also exists to protect such underground water sources from freezing so that these suction sources may be used throughout the year. These tanks also require proper ventilation to prevent tank collapse or rupture during the draining or rapid filling of the tank caused by negative vacuum or excessive pressures, respectively. As such, few buried water supplies are in use because of the unreliability that existed with their use.

SUMMARY OF THE INVENTION

The above disadvantages of the prior art are overcome by the present invention which aids in the effective withdrawal of water from underground tanks by providing a means to monitor the water level in the tank.

This monitoring means comprises a color indicator within a tube which indicates the level of fluid in the tank so as to allow the operator to monitor water level within the tank. Since these tanks are an emergency water source, it is imperative that the water level be accurately and readily determined. The monitoring means can also indicate possible leaks and low water levels during periods of non-use.

The present invention also provides a means of freeze protection comprising at least one drain hole located in a tube in communication with the fluid in the tank. Preferably, the drain hole can be in the tube for level indication. The drain hole allows fluid standing above the top of the tank to drain, thereby receding below the frost line to be protected against freezing.

Furthermore, the present invention can provide a means to vent the tank so as to prevent tank collapse or rupture during the addition or removal of water from the tank. During drafting, air enters the tank and replaces the water as it is removed for fire suppression. This maintains atmospheric pressure inside the tank which prevents tank collapse. During rapid fill, the vent means allows air to exhaust, preventing tank rupture.

These features of the present invention make underground tanks a viable source of water or other fire retardant liquid. Moreover, the present invention satisfies ISO regulations to be a viable suction source which could significantly improve the insurance evaluation in many rural communities.

DETAILED DESCRIPTION OF THE INVENTION

The present invention is more particularly described in the following examples which are intended as illustrative only since numerous modifications and variations therein will be apparent to those skilled in the art.

As used in the specification and in the claims, "a" can mean one or more, depending upon the context in which it is used.

Figure 1:
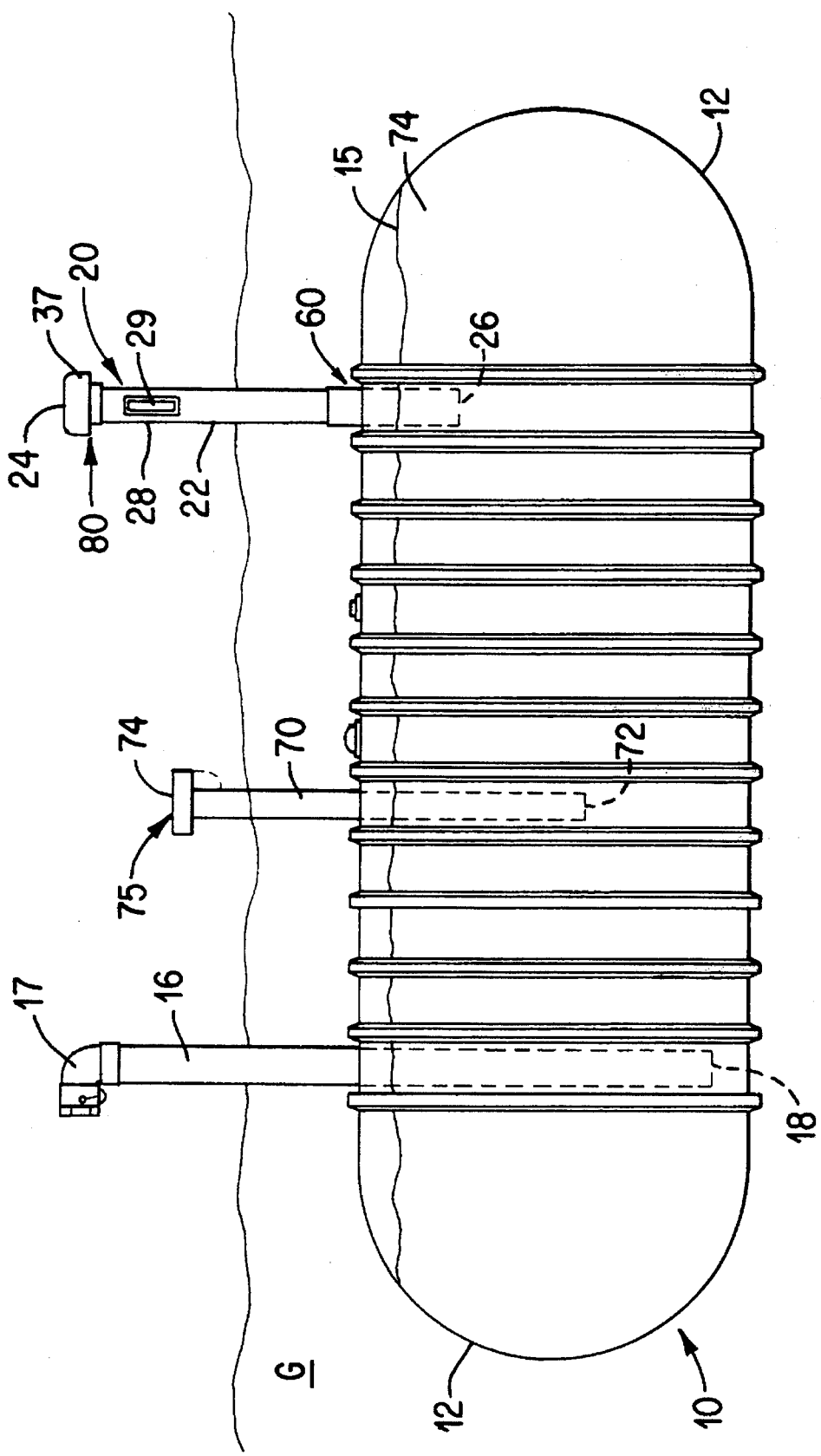
FIG. 1 is an elevational view, partially in schematic form, of an underground tank constructed in accordance with the present invention.

Referring now to FIG. 1, one embodiment of the present invention 10 is shown. It includes an underground tank 12 for fire suppression having a means 20 for visually determining the level 15 of fluid 14 inside the tank 12, a means for protecting against freezing 60, and a means for ventilating air 80 within the tank 12.

The fluid 14 in the tank 10 can be water. Likewise, the fluid 14 can be a mixture of water and a liquid fire retardant. It can also include any other aqueous fire-fighting agent known in the art.

FIG. 1 shows a tank 12 disposed beneath the ground G for holding fluid 14 therein and a dry hydrant head assembly 16 having a first end 17 above the ground G and an opposite second end 18 in communication with the fluid 14 in the tank 12. The dry hydrant head assembly 16 has piping plumbed down into the tank 12. A fire truck can connect a hard suction hose to this dry hydrant head 16, allowing the truck to draft water for use in fire suppression. The fire truck must have a pump capable of drafting from lifts equal to the depth of the buried tank 12. Such a pump is generally referred to as a "Class A" fire pump. Additionally, the pump should have a gated suction to control loss of prime and to prevent cavitation when the tank is pumped dry.

Figure 2:
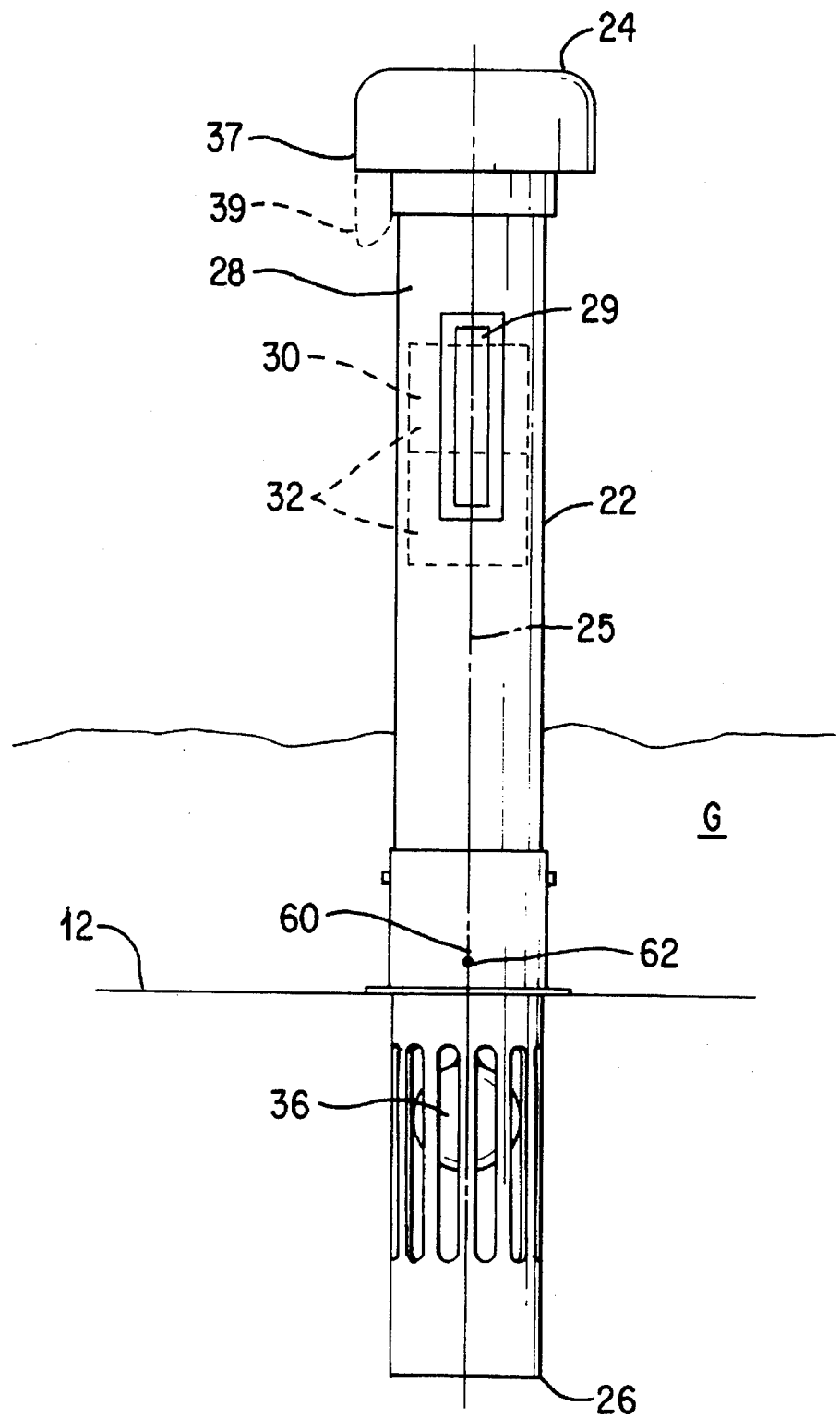
FIG. 2 is a side profile view of a sight, vent, and drain system.
Figure 3:
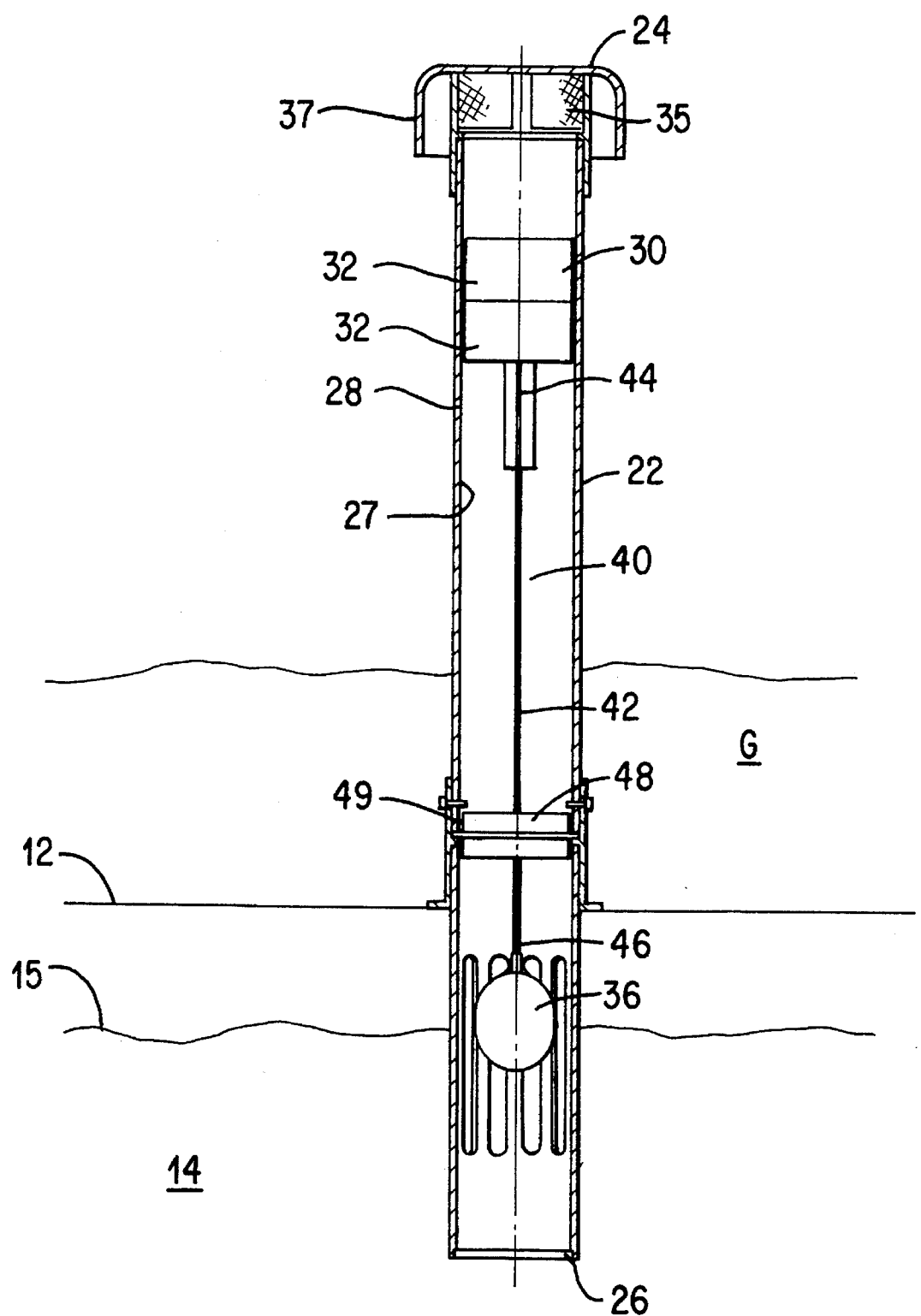
FIG. 3 is a vertical sectional view of the present invention.

As shown in FIGS. 1–3, the improvement for this tank assembly comprises a means 20 for visually determining the level 15 of the fluid 14 inside the tank 12. The determining means 20 can comprise a tube 22 wherein the tube 22 has a top end 24 above the ground G, an opposite bottom end 26 in communication with the fluid 14 in the tank 12, a longitudinal axis 25 between the top end 24 and the bottom end 26, an inner surface 26, and an outer surface 28. In conjunction, the determining means 20 can include an indicator 30 having a plurality of colors 32, each color 32 representing a preselected level of fluid in the tank 12, a float 36 located elevationally below the indicator 30, a means for connecting 40 the indicator 30 to the float 36, and an opening 29 within the tube 22 which is in registry with a selected one or more of the colors 32.

The tube 22 preferably is cylindrical, but it is contemplated that other shapes (e.g., square, pentagon, etc.) can be used. The tube also can have a cap assembly comprising a cap 37 and a wire mesh 39 connecting the cap 37 to the tube 22. This cap assembly can act as a deterrent to vandalism. The top 24 of the tube 22 can also have a screen 35 to prevent entry of animals and foreign material into the tube 22.

In a presently preferred embodiment, there are two colors 32 on the indicator 30. A green color indicates a full tank while red indicates a below normal water level. It is contemplated that more colors 32 can be used to provide a more detailed indication of the level in the tank 12. It is also contemplated that this design will provide visual recognition of the water level at a quick glance from a distance of 100 feet. The indicator 30 can also have numerical markings to indicate the level 15 of fluid 14 in the tank.

The float 36 preferably is a float ball as shown in FIGS. 2 and 3 which is smaller than the inside dimension of the tube 22 for air to pass between the inside surface 27 of the tube 22 and the float 36 to allow venting air into and out of the tank 12. In addition, upward travel of the float 36 is limited to ensure that a sufficient air passage exists into the tank 12. Downward travel of the float 36 can also be limited to assure that the colors 32 on the indicator 30 remain within the sight opening 29 of the tube 22 at all times.

The connecting means 40 is a rod 42 having a top end 44 mounted to the indicator 30 and a bottom end 46 mounted to the float 36. The rod 38 includes at least one spacer 48 having an outer periphery 49 mounted on the rod 42. The distance from the rod 42 to the outer periphery 49 is less than the inner dimension of the inner surface 27 of the tube 22 to allow the spacer 48 to slidably move therein. Since the presently preferred embodiment of the tube 22 has cylindrical shape, the distance from the rod 42 to the outer periphery 49 is less than the inner radius of the tube 22. The spacer 48 maintains the rod 42 substantially vertical along the longitudinal axis 25 of the tube 22. Preferably, a plurality of spacers 48 are used in conjunction with the rod 42. The spacers 48 can be manufactured from molded ABS supports. A spacer can alternatively be referred to as a "spider" because it can be designed with spider-like legs radiating out from the center hole. These spider-like legs allow free flow of air into and out of the tube 22.

The indicator 30 can be an open cylinder which allows air to move through the center of the tube 22. The indicator 30 can be attached to the rod 42 via a spacer 48. Thus, the area between the legs of the spacer 48 is open to allow the free flow of air while the tips of the legs of the spacer 48 supports and holds the indicator 30 in place.

During filling, it is easy to overflow the tank 12 with the fluid that accumulates in the risers extending above the tank 12 freezing. Thus, the present invention further comprises a means for protecting 60 the fluid 14 from freezing. As shown in FIG. 1, the protection means 60 can comprise the tube 22 having at least one drain hole 62 therethrough to permit fluid to flow from the inner surface 27 to exteriorly the outer surface 28 of the tube 22. Preferably, the drain hole 62 can be disposed elevationally above the tank 12 and below the frost line of the ground G. When installed properly, a gravel bed reservoir can be adjacent the drain hole 62. This gravel bed facilitates the ability of the drain hole 62 to allow fluid to exit therefrom unimpeded.

The supply of fluid 14 into the tank 12 can be accomplished through the dry hydrant head assembly 16. Obviously, this option is not feasible if the tank 12 needs to be re-filled during fire fighting. The present invention, therefore, further comprises a fill port 70 having a lower end 72 in communication with the fluid 14 in the tank 12 and an opposite upper end 74 above the ground G. The presently preferred embodiment comprises a fill port 70 that is a 2½ inch male NST fill connection.

The fill port 70 also has a means for filling 75 the underground tank 12 with fluid 14. Filling the tank 12 can be accomplished using gravity, off loaded under pressure from another pumper or tanker, or any other technique known in the art. Using a separate fill port 70 allows adding more fluid to the tank while continuing ongoing fire suppression efforts. This is advantageous compared to the alternative of disconnecting the pump from the tank 12 and then reconnecting it to another fire-fighting source of fluid.

The present invention can further comprise a means for ventilating air 80 from the tank 12. The ventilation means 80 can comprise the tube 22 having an air passage 82 therethrough that allows air to enter the underground tank 12 from above the ground G during removal of fluid 14 from the tank 12 and allows air to exit the tank 12 to above the ground G during the addition of fluid 14 into the tank 12. In the preferred embodiment, the tube 22 can be 6 inches or greater in diameter. This allows for better ventilation than the prior art because other risers used with tanks 12 had a diameter in the range of 2½ inches to 4 inches.

The present invention also provides a method of fire suppression using a tank 12 disposed beneath the ground G for holding fluid 14 therein, a dry hydrant head 16 having a first end 17 above the ground G and an opposite second end 18 in communication with the fluid 14 in the tank 12 The first step of the method entails adding fluid to the tank 12. The next step is applying a demand pressure to the dry hydrant head 16 to begin drawing fluid 14 from the tank 12.

As required, the method involves viewing a color indicator 30 so as to determine the level 15 of fluid 14 in the tank 12.

Throughout this application, various publications are referenced. The disclosures of these publications in their entireties are hereby incorporated by reference into this application in order to more fully describe the state of the art to which this invention pertains.

Although the present process has been described with reference to specific details of certain embodiments thereof, it is not intended that such details should be regarded as limitations upon the scope of the invention except as and to the extent that they are included in the accompanying claims.

What is claimed is:

1. An improved apparatus for fire suppression of the type comprising a tank disposed beneath the ground for holding fluid therein and a dry hydrant head having a first end above the ground and an opposite second end in communication with the fluid in the tank, wherein the improvement comprises means for visually determining the level of the fluid inside the tank which is disposed beneath the ground and used for fire suppression.

2. An improved apparatus for fire suppression of the type comprising a tank disposed beneath the ground for holding fluid therein and a dry hydrant head having a first end above the ground and an opposite second end in communication with the fluid in the tank, wherein the improvement comprises means for visually determining the level of the fluid inside the tank, wherein the determining means comprises:

a) a tube having a top end above the ground, an opposite bottom end in communication with the fluid in the tank, an inner surface, and an outer surface;
   b) an indicator having a plurality of colors, each color representing a preselected level of fluid in the tank;
   c) a float located elevationally below the indicator;
   d) means for connecting the indicator to the float; and
   e) an opening within the tube which is in registry with a selected one or more of the colors.

3. The apparatus of claim 2, wherein the connecting means is a rod having a top end mounted to the indicator and a bottom end mounted to the float.

4. The apparatus of claim 3, further comprising at least one spacer having an outer periphery mounted on the rod wherein the distance from the rod to the outer periphery is less than the inner dimension of the inner surface of the tube to allow the spacer to slidably move therein, wherein the spacer maintains the rod substantially vertical along the longitudinal axis of the tube.

5. The apparatus of claim 2, wherein the tube further comprises means for protecting the fluid from freezing comprising the tube having at least one drain hole therethrough to permit fluid to flow from the inner surface to exteriorly the outer surface, the drain hole disposed elevationally above the tank and below the frost line of the ground.

6. The apparatus of claim 1, wherein the fluid is water.

7. The apparatus of claim 1, wherein the fluid is a mixture of water and a liquid fire retardant.

8. The apparatus of claim 1, further comprising a fill port having a lower end in communication with the fluid in the tank and an opposite upper end above the ground.

9. The fill port of claim 8, further comprising means for filling the underground tank with fluid.

10. The apparatus of claim 2, further comprising means for ventilating air from the tank.

11. The apparatus of claim 10, wherein the ventilation means is the robe having an air passage therethrough that allows air to enter the underground tank from above the ground during removal of fluid from the tank and allows air to exit the tank to above the ground during the addition of fluid into the tank.

12. A method of fire suppression using a tank disposed beneath the ground for holding fluid therein, a dry hydrant head having a first end above the ground and an opposite second end in communication with the fluid in the tank, comprising the steps of:

a) adding fluid to the tank;
   b) applying a demand pressure to the dry hydrant head to begin drawing fluid from the tank for fire suppression; and
   c) viewing a color indicator so as to determine the level of fluid in the tank.

* * * * *